RE 24936
Oct. 14, 1958   D. L. HEPLER   2,855,813
SEALING TOOL CONSTRUCTION
Filed Sept. 1, 1955   2 Sheets-Sheet 1
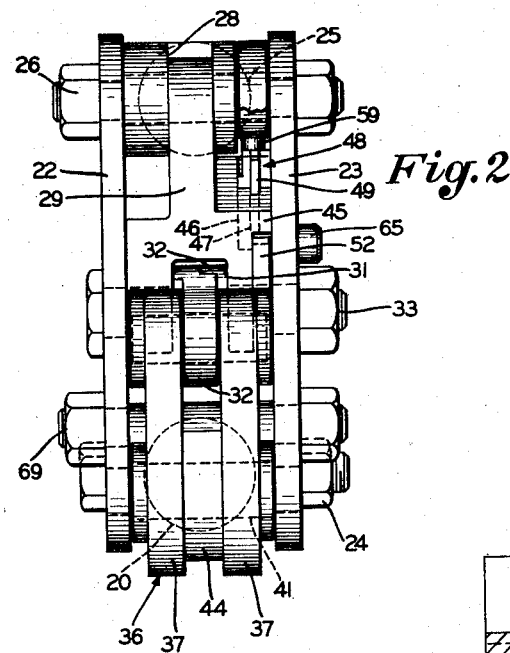
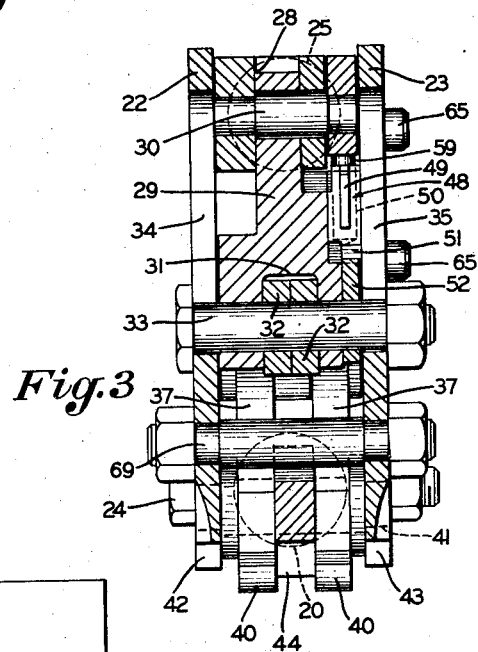
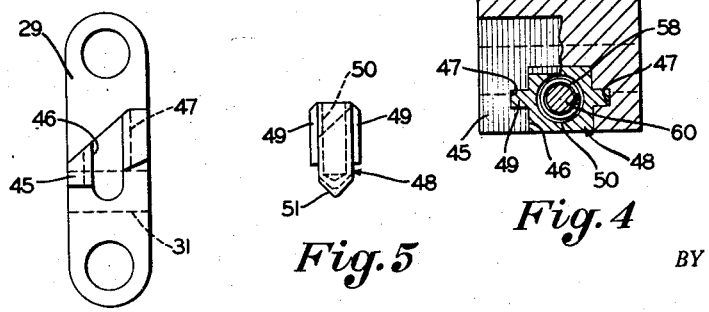
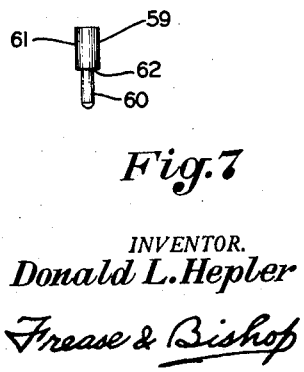
Fig. 1
Fig. 2
Fig. 3
Fig. 4
Fig. 5
Fig. 6
Fig. 7
INVENTOR.
Donald L. Hepler
BY
Frease & Bishop
ATTORNEYS Oct. 14, 1958     D. L. HEPLER     2,855,813
SEALING TOOL CONSTRUCTION
Filed Sept. 1, 1955     2 Sheets-Sheet 2
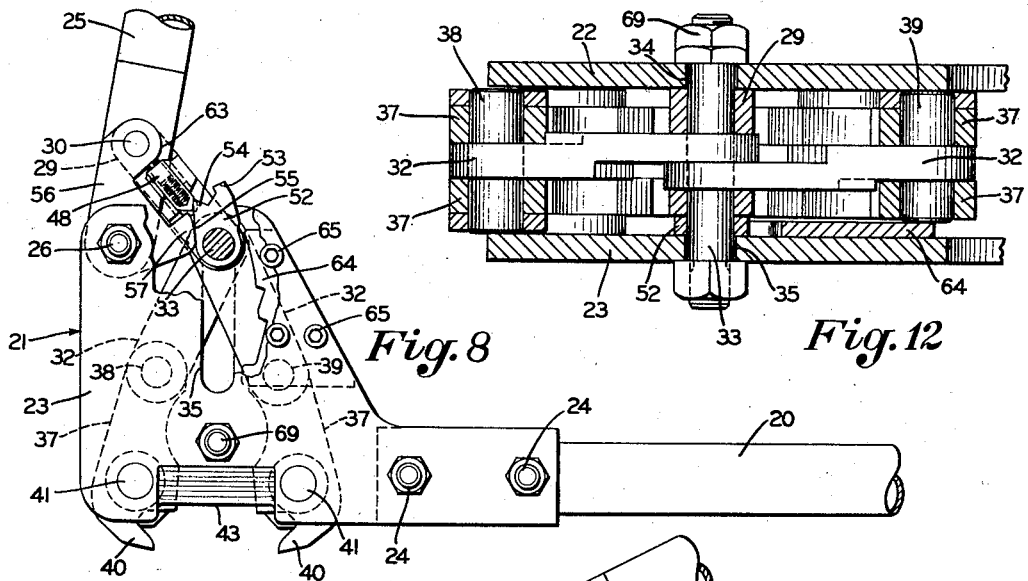
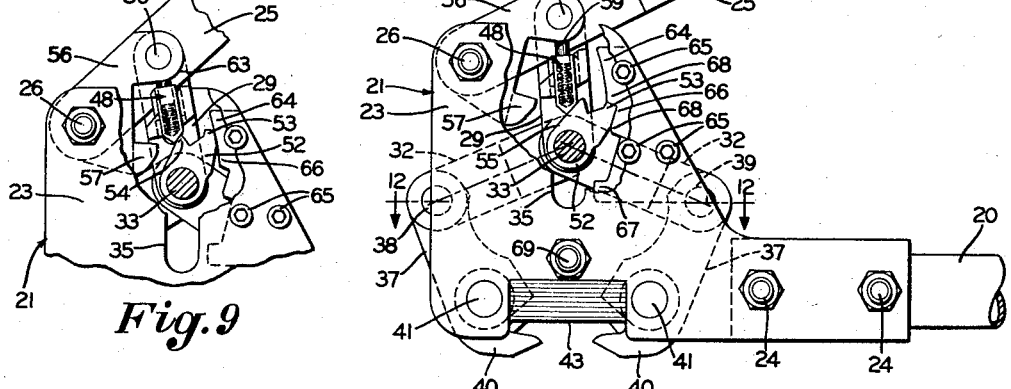
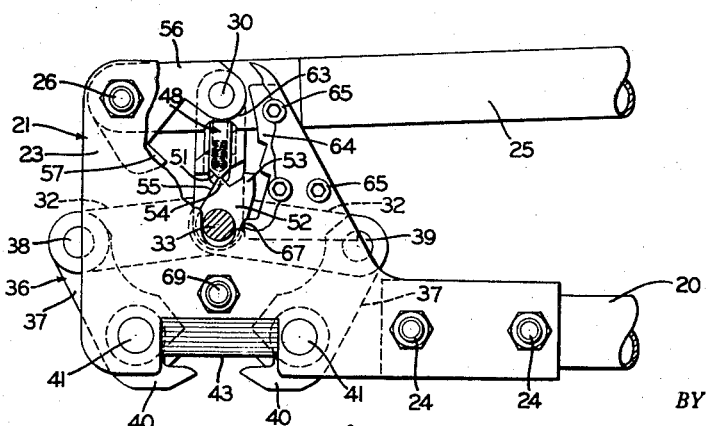
INVENTOR.
Donald L. Hepler
BY Frease & Bishop
ATTORNEYS United States Patent Office 2,855,813
Patented Oct. 14, 1958

2,855,813

SEALING TOOL CONSTRUCTION

Donald L. Hepler, New Bedford, Pa., assignor to Sharon Steel Corporation, Sharon, Pa., a corporation of Pennsylvania Application September 1, 1955, Serial No. 531,915

9 Claims. (Cl. 81—9.1)

My invention relates to improvements in sealing tool construction and more specifically to a safety sealing tool which is arranged to insure, upon use, that a seal is correctly and fully crimped around the overlapped ends of a length of strapping surrounding an object being strapped.

Certain prior constructions of sealing tools for crimping the usual generally U-shaped metal seal around overlapped ends of a piece of strapping positioned in surrounding relation to an object being strapped have merely included a pair of pivotally connected handles which are operably connected to a set of sealing jaws, so that movement of the handles in a direction to separate the same will cause the sealing jaws to open and the reverse movement will cause the sealing jaws to close, crimping a seal positioned between said jaws. One of the major difficulties with such a sealing tool construction is that due to negligence or fatigue, it is possible that the workmen operating the same may only partially close the handles of the tool resulting in the sealing jaws only partially securing the seal around the overlapped ends of strapping, and thereby providing an insecure joinder of the ends of strapping.

When an object is strapped with a piece of strapping thusly insecurely sealed, there is a great danger, during movement of the object, that the length or lengths of strapping binding the object will suddenly release, causing the object to become unbound. Further, a considerable danger to workmen is presented through such lengths of strapping releasing, since strapping is formed from relatively thin metal and necessarily has sharp edge portions. A sudden release of such a length of strapping may cause a portion thereof to strike a workman and thereby possibly cause serious bodily injury.

Another prior construction of sealing tool has included in addition to the pivotally connected handles and jaw members, a pawl and rack arrangement. The rack has usually included a series of uniformly spaced and formed teeth having a deep recess formed at either end thereof. Further, the pawl is urged by spring means to operatively engage the rack teeth during movement of the handles in either the closing or opening strokes, so that when either of said strokes is commenced, it is impossible to move the handles in the opposite direction until the stroke is completed. That is, as the handles are moved in a direction to close the jaws, the jaws must be completely closed to full crimping position before they can be moved in the opposite direction to open the same, and once the opening stroke is started, it likewise must be completed before the jaws can again be closed.

During the closing stroke, the spring loaded pawl engages the rack teeth at such an angle that the pawl will freely move out of engagement with one tooth and into engagement with the next adjacent tooth as the handles are moved toward each other, but prior to the completion of the closing or crimping strokes, as an attempt is made to move the handles in a direction to separate the same, the pawl will firmly engage with the rack teeth and prevent such movement. At the end of the crimping stroke and when the jaw members are closed in full crimping position, the pawl is received in the deep recess formed at that particular end of the rack, and thusly the angularity thereof is reversed so that similar to the crimping stroke, the opening stroke may take place, with the pawl similarly preventing the handles from being closed, but only allowing them to be opened during such stroke and after the stroke is commenced. Thus, once the crimping stroke is commenced, it must be carried to completion and the seal properly crimped joining the overlapped ends of strapping, before the jaws can be opened and the sealing tool removed therefrom.

One of the principal difficulties with such an arrangement of sealing tool is that although it is very desirous to have the crimping stroke controlled so that it must be completed before the opening stroke is started, the similar full control of the opening stroke frequently presents serious problems. For instance, at certain times, the seal being crimped may become slightly wedged in one of the sealing tool jaws during the crimping operation, and during the opening stroke of the tool it may be necessary to move the jaws quickly inwardly and outwardly to release the seal therefrom. When both the sealing and opening strokes are fully controlled, however, it is impossible to move the jaws in this way, so that it is necessary to use independent means to release the seal from the sealing jaws and frequently results in damage to the seal or the strapping as well as taking up valuable production time.

A further difficulty with such a sealing tool construction is that since the angularity of the pawl must be changed to permit the change in direction of the handles for the sealing or crimping and opening strokes, it is difficult to maintain the proper spring pressure against the pawl for urging it into engagement with the rack teeth. Thus, by use of prior spring means there is a possibility that a slight error in assembly of the sealing tool or a slight amount of wear of such tool might cause the pawl and rack arrangement to become inoperative, so that either the sealing tool cannot be used, or the pawl and rack will not operate to insure that the crimping stroke is fully completed.

It is therefore a general object of the present invention to provide a sealing tool construction which eliminates the above difficulties and disadvantages of the prior constructions.

It is a primary object of the present invention to provide a sealing tool construction which is arranged to insure that once the crimping stroke is started, it must be completed before the tool can be removed from around a seal being crimped.

It is a further object of the present invention to provide a sealing tool construction which includes means to insure that the crimping stroke will be completed once it has beeen started, but which means positively and completely disengages at the end of the crimping stroke providing complete freedom of movement of the jaws of the tool in either direction during the release or opening stroke thereof.

It is still a further object of the present invention to provide a sealing tool construction which includes a pawl and rack arrangement which is engaged during the crimping stroke preventing the crimping jaws from being opened during said crimping stroke and insuring that said stroke is completed and that the seal is properly crimped, and which pawl and rack are completely disengaged during the entire release or opening stroke of the jaws.

It is an additional object of the present invention to provide a sealing tool construction in which improved spring means is operative against the pawl of said construction insuring that the pawl and rack are positively engaged during the crimping stroke and positively disengaged during the opening stroke.

It is another object of the present invention to provide a sealing tool construction in which means are provided operative to positively engage a pawl and rack therein prior to the beginning of the crimping stroke and other means are provided to positively disengage such pawl and rack at the end of the crimping stroke and during the opening stroke.

Finally, it is an object of the present invention to provide a sealing tool construction which accomplishes all of the above objects, yet is relatively simple in construction, durable in use and may be manufactured at a minimum of cost.

These and other objects are accomplished by the parts, constructions, arrangements, combinations and subcombinations comprising the present invention, the nature of which is set forth in the following general statement, a preferred embodiment of which—illustrative of the best mode of which applicant has contemplated applying the principles—is set forth in the following description and illustrated in the accompanying drawings, and which is particularly and distinctly pointed out and set forth in the appended claims forming a part hereof.

In general terms, the sealing tool construction comprising the present invention may be stated as including a normally stationary handle having frame means thereon, an operating handle pivotally connected to the frame means, and sealing jaw means pivotally connected to the frame means and operatively connected to the operating handle so that a pivotal stroke of the operating handle in one direction closes the sealing jaws and in the opposite direction, opens the jaws. The frame means preferably includes a pair of spaced side plates secured at one portion thereof to the stationary handle in said spaced apart relationship.

The operating handle is preferably pivoted to the stationary handle frame means by a pivotal connection of one end of said operating handle to a pin received through and extending between the frame means. Further, the sealing jaw means preferably includes a pair of spaced crimping jaw members of usual construction for crimping a usual generally U-shaped metal seal around overlapped ends of a piece of strapping, with each of said jaw members also being pivotally connected to the frame means in spaced apart relationship by means of pins passing through each of said jaw members and connected to and passing between the frame means plate members.

The jaw members are pivotally connected to the frame means at a point spaced from the ends thereof at which end they are formed in the usual hooked shape to accomplish the seal crimping operation when said jaw member hooked ends are moved in a direction toward each other. The opposite ends of said jaw members are free from connection with the frame means and are each pivotally connected to a separate jaw link member.

The opposite ends of said jaw link members are pivotally connected at a common pivot point to each other and are also pivotally connected at said common pivot point to one end of an operating handle link member, which operating handle link member is pivotally connected at the opposite end thereof, to the operating handle at a point spaced from the point of pivotal connection of the operating handle to the frame means. Thus, upon pivotal movement of the operating handle, away from the frame means, the operating handle link member acts on the jaw link members, causing the jaw link members to pivot the jaw members in reference to the frame means in a direction to separate or open the hooked or seal-crimping ends of said jaw members. Movement of the operating handle toward the frame means likewise causes the jaw members to close in seal-crimping position.

Also, the sealing tool construction includes rack and pawl means associated with the stationary handle frame means, the operating handle and the sealing jaw means, with means engageable with the pawl prior to the beginning of the operating handle closing stroke for positioning the pawl in operative engagement with the rack during the closing stroke and means engageable with the pawl at the end of the closing stroke for placing the pawl in a position disengaged from the rack during the operating handle opening stroke. Further, spring means is preferably associated with the pawl for positively maintaining the pawl in operative engagement with the rack during the operating handle closing stroke and positively maintaining the pawl disengaged from the rack during the operating handle opening stroke.

The pawl is preferably pivotally connected at the common pivot point of the jaw link members and the operating handle link member, with said pawl having a rack-engaging projection formed thereon, and a spring means positioning projection formed thereon spaced from said rack-engaging projection. The rack is secured between the stationary handle frame means spaced plates and is provided with a series of teeth and also with a pawl disengaging projecting portion formed to place the pawl in a position disengaged from the rack at the end of the operating handle closing stroke.

The spring means is preferably mounted on the operating handle link member and preferably includes a slidably mounted pawl-engaging pin or plunger member urged toward the pawl by resilient means, with the pin member engaging the pawl between the pawl rack-engaging projection and the pawl spring means positioning projection during the opening stroke of the operating handle for maintaining the pawl disengaged from the rack, and engaging the pawl at the side of the spring means positioning projection opposite from the pawl rack-engaging projection during the operating handle closing stroke for maintaining the pawl in operative engagement with the rack. Finally, the operating handle is formed with a pawl-engaging projecting portion engageable with the pawl at the end of the operating handle opening stroke for moving the pawl into a position in engagement with the rack.

Thus, as the operating handle is moved in the opening stroke, the pin member of the spring means is engaged between the pawl rack-engaging projection and the pawl spring means positioning projection, maintaining the pawl in a position disengaged from the rack. As the operating handle reaches the end of the opening stroke, the pawl-engaging projecting portion on the operating handle engages the pawl, and continued movement of the operating handle toward fully open position moves the pawl into engagement with the rack, with such movement of the pawl being permitted by the spring means pin member passing over the pawl spring means positioning projection to the side of said projection opposite from the pawl rack-engaging projection. Also, as the operating handle reaches the end of its closing stroke, the rack pawl-disengaging projecting portion engages the pawl, and continued closing movement of the operating handle causes the pawl to be moved to a position disengaged from the rack, during which movement, the spring means pin member again moves over the pawl spring means positioning projection and is received between said projection and the pawl rack-engaging projection.

By way of example, an embodiment of the sealing tool construction of the present invention is illustrated in the accompanying drawings forming a part hereof, wherein like numerals indicate similar parts throughout the several views, and in which:

Fig. 1 is a side elevation of the sealing tool with a part thereof broken away to show internal mechanism, with the operating handle in maximum closed position and with the pawl in a position completely disengaged from the rack.

Fig. 2, a sectional view, part in elevation, looking in the direction of the arrows 2—2 in Fig. 1;

Fig. 3, a sectional view, part in elevation, looking in the direction of the arrows 3—3 in Fig. 1;

Fig. 4, a sectional view looking in the direction of the arrows 4—4 in Fig. 1;

Fig. 5, a side view of the spring means pin or plunger member;

Fig. 6, a side view of the operating handle connecting link;

Fig. 7, a side view of the spring means spring pin;

Fig. 8, a fragmentary side elevation of the sealing tool with a part thereof broken away, with the operating handle in maximum open position and with the pawl in position to engage the rack;

Fig. 9, a fragmentary side elevation, similar to Fig. 8, with the operating handle moved partially toward closed position and the pawl engaging the rack ahead of the first rack tooth;

Fig. 10, a fragmentary side elevation, similar to Fig. 8, with the operating handle moved partially toward closed position and with the pawl engaged in the first rack tooth;

Fig. 11, a fragmentary side elevation, similar to Fig. 8, with the operating handle moved nearly to maximum closed position and with the pawl intermediate its position engaged with the rack and its position completely disengaged from the rack; and Fig. 12, a sectional view, part in elevation, looking in the direction of the arrows 12—12 in Fig. 10.

The sealing tool construction comprising the present invention includes a normally stationary handle 20 having frame means, generally indicated at 21, mounted thereon. The frame means preferably includes a pair of spaced side plates 22 and 23 secured to the stationary handle 20 spaced apart relationship by the bolts 24.

An operating handle 25 is pivotally connected between the side plates 22 and 23 at a point spaced from the stationary handle 20 by means of the bolt 26. A generally U-shaped handle stop 27 is mounted on the operating handle in alignment with and extending toward the stationary handle 20, with the stop member 27 limiting the movement of the operating handle 25 toward the stationary handle 20, as shown in Fig. 1. Each of the stationary and operating handles 20 and 25 are preferably formed of cylindrical tubing, as shown.

The end of the operating handle 25 which is pivotally connected to the side plates 22 and 23 is formed generally U-shaped for a portion of said handle, forming the slot 28. The operating handle connecting link member 29 is received within slot 28 and is pivotally connected to handle 25 by the pivot pin 30 at a point spaced from the point of connection of handle 25 to the side plates 22 and 23.

The end of link member 29 opposite from its point of connection to the operating handle 25 is formed in a generally U-shaped configuration forming the slot 31, in which slot are received the ends of a pair of jaw connecting links 32. Links 32 are pivotally connected to the link 29 by means of the pivot bolt 33.

The side plates 22 and 23 are formed with slots 34 and 35, respectively, with said slots being positioned in alignment when the side plates 22 and 23 are assembled on the stationary handle 20. Pivot bolt 33 is received through slots 34 and 35 when in assembled position, pivotally connecting the operating handle connecting link 29 and the jaw-connecting links 32 for a purpose to be hereinafter described.

The ends of the jaw-connecting links 32 opposite from the ends thereof pivotally connected to the operating handle connecting link 29, are each pivotally connected to one end of similar jaw members 36. Each of the jaw members 36 includes similar aligned spaced jaw links 37, which links are pivotally connected at either side of one of the jaw-connecting links 32 by means of the pivot pins 38 and 39.

The jaw links 37 are formed at the ends thereof spaced from the jaw-connecting links 32 in the usual hook shaped fashion forming the jaw member seal-crimping end portions 40. Further, jaw links 37 are pivotally connected at points spaced from the end portions 40 to the side plates 22 and 23 by means of the pivot pins 41, as shown. That is, as illustrated in Figs. 1 and 2, each of the jaw members 36 is comprised of a pair of spaced jaw links 37, and each of these jaw members 36 is pivotally connected between the spaced side plates 22 and 23, with the seal-crimping end portions 40 of each of the members 36 being positioned spaced apart and formed in a hooked shape extending toward each other.

Side plates 22 and 23 are preferably formed with recesses 42 and 43. Bridge plate 44 is assembled between each of the sets of jaw links 37 of jaw members 36 and surrounding the pivot pins 41. Thus, recesses 42 and 43 of side plates 22 and 23 and the bridge plate 44 form surfaces coacting with the seal-crimping end portions 40 of jaw members 36 to retain and crimp a seal around overlapped ends of strapping, when the end portions 40 are pivoted in a direction toward each other.

Connecting link member 29 is formed at the surface thereof facing side plate 23, with an outwardly extending portion 45 in which is formed the plunger or pin guide slot or guideway 46, as best seen in Figs. 4 and 6, with said slot extending generally longitudinally of link 29. Further, guide slot 46 includes flange groove portions 47 extending laterally from slot 46 spaced intermediate the depth thereof.

As shown in Figs. 4 and 5, a plunger or pin 48 having the laterally extending flange portions 49 is slidably received within guide slot 46, with the flange portions 49 being received within the flange groove portions 47. Plunger 48 is formed with a spring-receiving hole 50 and a generally pointed pawl-engaging end portion 51.

Pawl 52 is pivotally mounted adjacent link 29 on pivot bolt 33 in alignment with plunger 48. Further, pawl 52 is formed with a rack-engaging projection 53 and a reversing projection 54, as shown, with plunger 48 being positioned with the pointed pawl-engaging end portion 51 adjacent pawl 52. Thus, the end portion 51 of plunger 48 may be selectively received between projections 53 and 54 of pawl 52, when pawl 52 is in one position, and may be received abutting a side surface 55 of pawl 52 at the side of reversing projection 54 opposite from the rack-engaging projection 53, when pawl 52 is in a second position.

A pawl reversing link 56 is mounted on bolt 26 and pivot pin 30 of operating handle 25 adjacent the inner surface of side plate 23 and abutting operating handle 25. Reversing link 56 extends downwardly in alignment with pawl 52 and is formed with a pawl-reversing projection 57 at a point spaced from operating handle 25, so that when operating handle 25 is pivoted in reference to the side plates 22 and 23, reversing link 56 will move with it and projection 57 will approach pawl 52.

Compression spring 58 is received within the hole 50 formed in the plunger 48 and is retained mounted in said hole under compression by means of the spring pin 59. Spring pin 59, as best seen in Fig. 7, is formed with a small diameter portion 60 and a large diameter portion 61, thereby forming an offset 62 therebetween. Pin 59 is mounted in hole 50 of plunger 48 with small diameter portion 60 received within spring 58, and with offset 62 abutting the end of spring 58.

Pawl-reversing link 56 is formed with a generally arcuate surface 63 at the portion thereof surrounding the pivot pin 30 and the upper end of large diameter portion 61 of spring pin 59 abuts this arcuate surface and may slide along the same as operating handle 25 is pivoted.

in reference to side plates 22 and 23, thereby pivoting link member 29 in reference to pawl-reversing link 56. Thus, spring pin 59 at all times resiliently urges plunger 48 toward pawl 52 through the spring 58, and thus the pointed end portion 51 of plunger 48 is at all times resiliently urged into engagement with pawl 52.

Rack plate 64 is mounted abutting the inner surface of side plate 23 by the screws 65, as shown, so that rack plate 64 is also in alignment with pawl 52. Rack plate 64 includes the pawl-engaging toothed portion 66 and the pawl-reversing projection portion 67, with the teeth 68 of portion 66 and also portion 67 extending in a direction toward the link 29 and pawl 52.

Because of the positioning of rack plate 64, it is necessary that the pivot pin 39, pivotally connecting the jaw-connecting link 32 and jaw member 36 at the side of the frame means 21 in which the jaw-connecting link 32 pivots in a plane adjacent rack plate 64, be of less length than the pivot pin 38 connecting link 32 and jaw member 36 at the opposite side of frame means 21. Further, various spacers are used mounted on the various pivot pins and bolts, as needed, to properly space the side plates 22 and 23 or to retain the various links properly assembled and pivotal, as required. Finally, a fastening bolt member 69 is received through and between the side plates 22 and 23 in the lower portion of these side plates for retaining them in proper assembly with the pivot pins 41 pivotally mounting the jaw members 36 in proper assembly, as shown.

For illustration of the operation of the sealing tool construction comprising the present invention, the sealing tool is shown in Fig. 1 in fully closed position. In such position, the pawl 52 is pivoted to a position disengaged from the toothed portion 66 of rack plate 64, with the pointed pawl-engaging end portion 51 of plunger 48 being received between the rack-engaging projection 53 and reversing projection 54 of pawl 52, thereby resiliently retaining said pawl in this disengaged position. Further, the operating handle 25 is in its maximum downward position with the handle stop 27 engaging stationary handle 20, and with handle connecting link member 29 moved to its maximum downward position causing the outer ends of jaw-connecting links 32 to pivot the jaw members 36 to closed position.

To begin the seal-crimping operation, the operating handle 25 is pivoted to its maximum upward position, as illustrated in Fig. 8, and during such pivoting motion, the pawl-reversing projection of pawl-reversing link 56 comes into contact with side surface 55 of pawl 52, forcing pawl 52 to pivot in a clockwise direction in reference to handle connecting link member 29, thereby forcing plunger 48 to move over reversing projection 54 of pawl 52 and engage against side surface 55 of said pawl. Further, this upward pivotal movement of operating handle 25 causes handle connecting link member 29 to move the pivot bolt 33 upwardly moving pawl 52 upwardly to the upper end of rack plate 64 and causing the jaw-connecting link members 32 to open or spread the seal-crimping end portions 40 of jaw members 36, as shown.

Since pivot bolt 33 is guided in its upward and downward movement by sliding in the slots 34 and 35 of side plates 22 and 23, these slots limit the upward movement of pivot bolt 33 and consequently the upward movement of operating handle 25. Also these slots, by maintaining the pivot pins 38 and 39 an equal distance from the vertical line of travel of the pivot bolt 33, force the jaw members 36 to pivot in a uniform manner around the pivot pins 41, so that the seal-crimping end portions 40 of jaw members 36 pivot in equal arcs and thereby uniformly crimp the seal around overlapped ends of strapping. This prevents a seal from being excessively crimped at one edge and not crimped at the other edge, which uneven crimping, if permitted, could result in an insecure joinder of the ends of strapping.

After the operating handle 25 has been pivoted to the position shown in Fig. 8, opening the jaw members 36 and causing the pawl 52 to pivot into rack-engaging position, the tool is placed so that the seal-crimping end portions 40 surround the edge portions of a conventional U-shaped seal, which seal has been placed around the overlapped end portions of a piece of strapping. The operating handle 25 is then pivoted in reference to the frame means 21 toward the stationary handle 20.

As shown in Fig. 9, the handle connecting link member 29 has moved the pivot bolt 33 downwardly, moving pawl 52 downwardly, so that the rack-engaging projection 53 on pawl 52 has engaged the upper portion of the toothed portion 66 of rack plate 64, said projection being resiliently urged toward said toothed portion by the plunger 48 resiliently urging pawl 52 to rotate in a clockwise direction, as viewed in Fig. 9. Further, this downward movement of pivot bolt 33 forces the inner ends of jaw-connecting links 32 downwardly forcing the pivot pins 38 and 39 to separate a greater distance and pivot the jaw members 36 in reference to the frame means 21, so that the seal-crimping end portions 40 of said jaw members have begun to close or move toward each other.

Continuing downward pivotal movement of operating handle 25, as illustrated in Fig. 10, the rack-engaging projection 53 of pawl 52 has engaged the first or uppermost tooth 68 of rack plate 64, said projection, as before, being resiliently urged into such engagement by plunger 48 resiliently bearing against side surface 55 of pawl 52. Also, this downward movement of pivot bolt 33 has caused the seal-crimping end portions 40 of jaw members 36 to move further inwardly toward seal-crimping position.

At this point, the seal-crimping end portions 40 of jaw members 36, coacting with the recess portions 42 and 43 of side plates 22 and 23 and the bridge plate 44, have begun to crimp the seal around the overlapped ends of strapping. Also, at this point, since the rack-engaging projection 53 of pawl 52 has engaged the first tooth 68 of rack plate 64, the operating handle 25 can no longer be moved upwardly until its full downward stroke has been completed. Thus, the seal-crimping end portions 40 of the jaw members 36 cannot be removed from engagement with the seal being crimped until the seal-crimping operation is complete.

As downward movement of operating handle 25 is continued, the rack-engaging projection 53 of pawl 52 continues to slide along the toothed portion 66 of rack plate 64 engaging with the various teeth 68 of said plate, until the pawl 52 engages the pawl reversing projecting portion 67 of the rack plate, as illustrated in Fig. 11. At this point, the seal-crimping end portions 40 of jaw members 36 have completely crimped the seal around the overlapped ends of strapping and the crimping operation is complete.

As shown in Fig. 11, as the operating handle 25 is moved downwardly in the latter portion of its downward pivotal stroke, the pawl-reversing projecting portion 67 of rack plate 64 engages pawl 52 moving the pawl in a counter clockwise direction, as viewed, so that the pointed pawl-engaging end portion 51 of plunger 48 moves over the reversing projection 54 on pawl 52, with Fig. 11 showing plunger 48 midway in such movement. Thus, as the operating handle 25 reaches its maximum downward position, so that the handle stop 27 engages stationary handle 20, the pointed pawl-engaging end portion 51 of plunger 48 has once again moved into engagement with pawl 52 between rack-engaging projection 53 and reversing projection 54 and into the position shown in Fig. 1, while jaw members 36 have been moved to their fully closed position.

Since pawl 52 is again in a position disengaged from rack plate 64, operating handle 25 may be pivoted upwardly in its opening stroke, causing the jaw members 36 to open and release the seal which is now fully crimped around the overlapped ends of strapping. Further, since pawl 52 is positively retained disengaged from rack plate 64 during such opening stroke, it is possible to move the jaw members 36 in any direction desired to release the crimped seal therefrom.

As described in the operation of the sealing tool of the present invention, once the seal-crimping operation has been started and the seal-crimping end portions 40, coacting with the side plates 22 and 23 and the bridge plate 44, have begun to crimp the seal around the overlapped ends of strapping, the pawl 52 engages the teeth 68 of the rack plate 64, preventing the jaw members 36 from being opened until the closing or crimping stroke of the operating handle 25 has been completed. In this way, it is impossible for the seal-crimping stroke to be only partially completed and then the sealing tool removed, resulting in a partially crimped seal which may later fail and release the overlapped ends of strapping.

Further, even though the crimping stroke is fully controlled and must be completed before the opening stroke can be commenced, the pawl reversing projecting portion 67 on the rack plate 64 completely disengages the pawl 52 from the rack plate 64 prior to this opening stroke. This permits complete freedom of movement of operating handle 25 and consequently jaw members 36 during the opening stroke, so that these jaw members may be moved in any manner necessary to disengage them from the fully crimped seal.

Also, the pawl-reversing projecting portion on rack plate 64, acting in cooperation with the resiliently mounted and therefore yieldable plunger 48, positions the pawl 52 positively disengaged from rack plate 64 during such opening stroke, while pawl-reversing projection 57 on pawl-reversing link 56 also cooperating with plunger 48, forces the pawl 52 to again move into positive rack-engaging position at the end of the opening stroke. Finally, the pawl 52 and the rack plate 64 are retained resiliently and positively engaged during the closing stroke of operating handle 25 and jaw members 36 by plunger 48 bearing against pawl side surface 55, and positively disengaged during the opening stroke of operating handle 25 and jaw members 36 by plunger 48 engaging between the pawl rack-engaging projection 53 and reversing projection 54.

Thus, there is provided a sealing tool construction which eliminates the above stated disadvantages of the prior constructions; which is arranged to insure that once the crimping stroke is started, it must be completed before the tool can be removed from around a seal being crimped; which includes means to insure that the crimping stroke will be completed once it has been started, but which means positively and completely disengages at the end of the crimping stroke providing complete freedom of movement of the jaw means of the tool in either direction during the release or opening stroke thereof; which includes a pawl and rack arrangement which is engaged during the crimping stroke preventing the crimping jaws from being opened during said crimping stroke and insuring that the same is completed and that the seal is properly crimped, and which pawl and rack are completely disengaged during the entire release or opening stroke of the jaws; in which improved spring means is operative against the pawl of said construction insuring that the pawl and rack are positively engaged during the crimping stroke and positively disengaged during the opening stroke; in which means are provided operative to positively engage a pawl and rack therein prior to the beginning of the crimping stroke and other means are provided to positively disengage such pawl and rack at the end of the crimping stroke and during the opening stroke; and which is relatively simple in construction, durable in use and may be manufactured at a minimum of cost.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the improved construction illustrated and described herein are by way of example, and the scope of the present invention is not limited to the exact details of the construction shown.

Having now described the invention, the construction, operation and use of preferred embodiments thereof, and the advantageous new and useful results obtained thereby; the new and useful construction and reasonable mechanical equivalents thereof, obvious to those skilled in the art, are set forth in the appended claims.

I claim:

1. Sealing tool construction including a normally stationary handle having frame means thereon, an operating handle pivotally connected to said frame means, sealing jaws pivotally connected to said frame means and being operably connected to the operating handle so that a pivotal stroke of said handle in one direction in reference to said frame means closes said jaws and in the opposite direction opens said jaws, a rack operatively connected with the frame means, a pawl operatively connected with the operating handle, said rack having a length and having at least two spaced projections formed along said length, first means operatively connected with the operating handle and being engageable with the pawl for placing said pawl in operative engagement with the rack for preventing opening movement of the operating handle during said handle closing stroke, second means operatively connected with the frame means and being engageable with the pawl for placing the pawl in a position disengaged from the rack for permitting free movement of the operating handle during said handle opening stroke, and resilient projection means operatively engaged with the pawl for positively maintaining the pawl in operative engaged position during said closing stroke and disengaged position during said opening stroke.

2. The sealing tool construction as defined in claim 1 in which said first means is positioned with respect to the operating handle so that said first means automatically engages the pawl at the end of the operating handle opening stroke; and in which said second means is positioned with respect to the frame means so that said second means automatically engages the pawl at the end of the operating handle closing stroke.

3. The sealing tool construction as defined in claim 1 in which said first means includes projection means on the operating handle engageable with the pawl at the end of said handle opening stroke; and in which said second means includes projection means on the rack engageable with the pawl at the end of the operating handle closing stroke.

4. The sealing tool construction as defined in claim 1 in which the pawl includes a rack engaging projection and a reversing projection spaced from said rack engaging projection, and a side surface being formed on the pawl adjacent said reversing projection and at the side of the reversing projection opposite from said rack engaging projection; and in which the resilient projection means includes a spring-pressed plunger engageable between the pawl engaging and reversing projections of the pawl during the operating handle opening stroke and engageable with said pawl side surface during the operating handle closing stroke.

5. Sealing tool construction including a normally stationary handle having frame means thereon, an operating handle pivotally connected to said frame means, sealing jaws pivotally connected to said frame means, link means pivotally connecting the operating handle and the sealing jaws so that a pivotal stroke of said handle in one direction in reference to the frame means closes said jaws and in the opposite direction opens said jaws, rack means and pawl means mounted one operatively connected with the link means and one operatively connected with the frame means, said rack means having a length and at least two spaced projections formed along said length, means operatively connected with one of said rack means and pawl means for automatically positioning the rack means and pawl means in a position for the pawl means to engage the rack means during the closing stroke of the operating handle to prevent opening movement of the operating handle during said closing stroke, and means operatively connected with one of said rack means and pawl means for automatically positioning the rack means and pawl means in a completely disengaged position during the opening stroke of the operating handle to permit free movement of the operating handle during said opening stroke.

6. Sealing tool construction including a normally stationary handle having frame means thereon, an operating handle pivotally connected to said frame means, sealing jaws pivotally connected to said frame means and being operatively connected to the operating handle so that a pivotal stroke of said handle in one direction in reference to said frame means closes said jaws and in the opposite direction opens said jaws, rack means operatively connected with one of said operating handle and frame means and pawl means operatively connected with the other of said operating handle and frame means, said rack means having a length and having at least two spaced projections formed along said length, means operatively connected with one of said rack means and pawl means for automatically positioning the rack means and pawl means in a position for the pawl means to engage the rack means during the closing stroke of the operating handle to prevent opening movement of the operating handle during said closing stroke, and means operatively connected with one of said rack means and pawl means for automatically positioning the rack means and pawl means in a completely disengaged position during the opening stroke of the operating handle to permit free movement of the operating handle during said opening stroke.

7. The sealing tool construction as defined in claim 5 in which the rack means and pawl means includes a pawl pivotally mounted on the link means, a rack mounted on the stationary handle frame means, and the pawl being movable to a position to be engaged with the rack during the operating handle closing stroke and movable to a position completely disengaged from the rack during the operating handle opening stroke; in which the means automatically positioning includes projection means mounted on the operating handle engageable with the pawl at the end of said handle opening stroke for operably moving the pawl to a position to be engaged with the rack; and in which the means automatically positioning also includes projection means mounted on the rack engageable with the pawl at the end of the operating handle closing stroke for completely disengaging the pawl from the rack.

8. The sealing tool construction as defined in claim 5 in which the rack means and pawl means includes a pawl pivotally mounted on the link means, a rack mounted on the stationary handle frame means, the pawl being movable to a position engaged with the rack during the operating handle closing stroke and movable to a position disengaged from the rack during the operating handle opening stroke, the pawl having a rack-engaging projection and a reversing projection spaced from said rack-engaging projection, and a side surface being formed on the pawl adjacent said reversing projection and at the side of the reversing projection opposite from said rack-engaging projection; in which a spring-pressed plunger is slidably mounted on the link means adjacent the pawl and being urged toward said pawl, said plunger being engaged between the pawl rack-engaging and reversing projections during the operating handle opening stroke, and said plunger being engaged with said pawl side surface during the operating handle closing stroke; and in which a first means is engageable with the pawl for positioning the pawl in rack-engaging position during the operating handle closing stroke, and a second means is engageable with the pawl for placing the pawl in a position disengaged from the rack during the operating handle opening stroke.

9. The sealing tool construction as defined in claim 5 in which the rack means and pawl means includes a pawl pivotally mounted on the link means, a rack mounted on the stationary handle frame means, the pawl being movable to a position engaged with the rack during the operating handle closing stroke and movable to a position disengaged from the rack during the operating handle opening stroke, the pawl having a rack-engaging projection and a reversing projection spaced from said rack-engaging projection, and a side surface being formed on the pawl adjacent said reversing projection and at the side of the reversing projection opposite from said rack-engaging projection; in which a guideway is mounted on the link means adjacent the pawl, a spring-pressed plunger is slidably mounted in said guideway and being urged toward said pawl, said plunger being engaged between the pawl rack-engaging and reversing projections during the operating handle opening stroke, and said plunger being engaged with said pawl side surface during the operating handle closing stroke; in which a projecting portion is mounted on the operating handle engageable with the pawl at the end of said handle opening stroke for operably engaging the pawl with the rack; and in which a projecting portion is mounted on the rack engageable with the pawl at the end of the operating handle closing stroke for disengaging the pawl from the rack.

References Cited in the file of this patent

UNITED STATES PATENTS

| | | |
|---|---|---|
| 1,071,139 | Brooks | Aug. 26, 1913 |
| 1,984,652 | Ott | Dec. 18, 1934 |
| 1,996,202 | Harvey | Apr. 2, 1935 |
| 2,113,757 | Bletso | Apr. 12, 1938 |